United States Patent [19]

Harris

[11] Patent Number: 5,289,997

[45] Date of Patent: Mar. 1, 1994

[54] APPARATUS AND METHOD FOR REDUCING DRAG ON BODIES MOVING THROUGH FLUID

[76] Inventor: B. Waylon Harris, 826 E. Harmont Dr., Phoenix, Ariz. 85020

[21] Appl. No.: 30,649

[22] Filed: Mar. 12, 1993

Related U.S. Application Data

[63] Continuation-in-part of Ser. No. 873,398, Apr. 24, 1992, abandoned, which is a continuation-in-part of Ser. No. 687,172, Apr. 18, 1991, Pat. No. 5,108,145.

[51] Int. Cl.$^5$ ............................................... B64C 1/38
[52] U.S. Cl. ................... 244/130; 244/200; 102/501; 296/180.1; 296/180.4
[58] Field of Search ................. 296/180.1, 180.4; 244/130, 200; 102/501, 490

[56] References Cited

U.S. PATENT DOCUMENTS

| | | | |
|---|---|---|---|
| 13,397 | 4/1912 | Way | 244/130 |
| D. 326,885 | 6/1992 | Paul | D21/214 |
| 1,864,803 | 6/1932 | Clark | 244/130 |
| 1,903,823 | 4/1933 | Lougheed | 244/130 |
| 1,994,045 | 3/1935 | Nelson | 244/12 |
| 2,261,558 | 11/1941 | Orloff | 244/130 |
| 2,800,291 | 7/1957 | Stephens | 244/41 |
| 2,899,150 | 8/1959 | Ellis, Jr. | 244/41 |
| 3,578,264 | 5/1971 | Kuethe | 244/41 |
| 3,776,363 | 12/1973 | Kuethe | 181/33 C |
| 4,130,061 | 12/1978 | Boggs et al. | 102/66 |
| 4,180,290 | 12/1979 | Drews | 296/180.1 |
| 4,284,302 | 8/1981 | Drews | 296/180.1 |
| 4,455,045 | 6/1984 | Wheeler | 296/180.1 |
| 4,650,138 | 3/1987 | Grose | 244/130 |
| 4,682,808 | 7/1987 | Bilanin | 296/180.1 |
| 4,776,535 | 10/1988 | Paterson | 244/130 |
| 4,789,117 | 12/1988 | Paterson | 244/130 |
| 4,813,633 | 3/1989 | Werle et al. | 244/130 |
| 4,861,093 | 8/1989 | Chapman | 296/180.1 |
| 4,960,283 | 10/1990 | Gobush | 272/232 |
| 5,133,516 | 7/1992 | Marentic et al. | 244/130 |

FOREIGN PATENT DOCUMENTS

| | | | |
|---|---|---|---|
| 927616 | 5/1982 | U.S.S.R. | |
| 453086 | 9/1936 | United Kingdom | 296/180.1 |

OTHER PUBLICATIONS

"Balls", in Golf Magazine, Mar. 1990 issue, pp. 86, 87, 118, 120 and 127–130.

*Primary Examiner*—Robert R. Song
*Attorney, Agent, or Firm*—Charles E. Cates

[57] ABSTRACT

In order to increase energy efficiency by reducing the drag experienced by bodies moving through a fluid medium, such as tractor-trailers, structure is incorporated in the rear surface or panel of the bodies. The structure is implemented with a multiplicity of cavities or a multiplicity of protruding regions. The cavities or protruding regions each comprise only a small portion of the total area of the rear surface and the depth or extension dimension, relative to the rear surface or panel, is small. In the case of a tractor-trailer, the rear surface structure permits convenient access to the interior of the vehicle and can be incorporated in either a rear door assembly or in a sliding rear panel assembly. The drag reduction benefits are achieved not only when the body is a tractor-trailer but also in the case of all types of land vehicles, water craft, aircraft, projectiles and the like which have a relatively flat rear surface.

22 Claims, 2 Drawing Sheets

APPARATUS AND METHOD FOR REDUCING DRAG ON BODIES MOVING THROUGH FLUID

This application is a continuation-in-part of copending application Ser. No. 07/873,398, filed on Apr. 24, 1992, abandoned, which is a continuation-in-part of 07/687,172 filed Apr. 18, 1991, U.S. Pat. No. 5,108,145.

BACKGROUND OF THE INVENTION

1. Field of the Invention

This invention relates generally to bodies which are designed to move through a fluid, such as air or water, and, more particularly, to techniques for the reduction of drag on said bodies by providing the bodies with structure on their rear surface.

2. Description of the Related Art

A great deal of effort has been exerted in the past to find ways of reducing the fluid drag which is encountered when bodies such as motor vehicles, water craft, aircraft, projectiles, and the like, move through fluid such as air or water in the course of their use. The major concentration of aerodynamic research has been to alter the structure of the various bodies to achieve streamlining, or in the alternative, to provide the top, bottom or side surfaces of the body with various kinds of corrugations, troughs, ridges, and the like, which are designed to create turbulence in the boundary layer and thus reduce drag.

Thus, U.S. Pat. No. 2,261,558, issued on Nov. 4, 1941, to Orloff; U.S. Pat. No. 2,800,291, issued on Jul. 23, 1957, to Stephens; U.S. Pat. No. 2,899,150, issued on Aug. 11, 1959, to Ellis; and U.S. Pat. No. 4,650,138, issued on Mar. 17, 1987, to Grose; show various grooves, depressions, and the like in the leading or top surfaces of aircraft wings, designed to act as drag reducers.

Similarly, U.S. Pat. No. 4,284,302, issued on Aug. 18, 1981, to Drews; U.S. Pat. No. 4,180,290, issued on Dec. 25, 1979 to Drews; U.S. Pat. No. 4,776,535, issued on Oct. 11, 1988, to Paterson; U.S. Pat. No. 4,789,117, issued on Dec. 6, 1988, to Paterson; U.S. Pat. No. 4,813,633, issued on Mar. 21, 1989, to Werle; and British Patent 453,086, issued Sep. 4, 1936, to Staunton; show similar treatment of the leading, top and side surfaces of motor vehicles, such as cars and trucks.

There is less evidence of efforts to achieve drag reduction by modifying the back vertical surfaces of vehicles, craft, projectiles or other bodies which move through a fluid environment. Some activity along this line is shown in U.S. Pat. No. 4,702,509, issued on Oct. 27, 1987 to Elliott; U.S. Pat. No. 4,861,093, issued on Aug. 29, 1989, to Chapman; Russian Patent 927,616, issued May 15, 1982; and U.S. Pat. No. 4,682,808, issued on Jul. 28, 1987, to Bilanin, which show the addition of streamlining airbags, or flow-through channels, or other forms of bulky vanes or panels to rear vertical surfaces. However, those references are generally applicable to tractor-trailers or other motor vehicles having add-on structures which are so large that they must be removed and stored when access to the interior of the vehicle is required. These structures also can provide an appreciable contribution to the overall length of the motor vehicle.

FEATURES OF THE INVENTION

It is an object of the present invention to provide a method and apparatus for reducing drag on a body, such as a motor vehicle, water craft, aircraft, projectile, or the like which moves through a fluid medium in its normal usage.

It is another object of the invention to provide the rear surface or panel of such a body with drag reduction structure which is highly effective but which is relatively simple to install and occupies relatively little space.

It is a further object of the invention to furnish motor vehicles such as trailer trucks or vans with rear panel drag reduction structure which is unobtrusive and does not interfere with normal access to the interior of the vehicle and does not require storage of the structure during such access.

Other objects and advantages of the invention will become apparent as the specification proceeds.

SUMMARY OF THE INVENTION

In accordance with the present invention structure elements, such as dimples or brambles or the like, are distributed on the rear surface or panel of a body which moves through a fluid medium, to thereby reduce the fluid drag on said body.

The body may be any vehicle, craft or projectile which has a front end and a rear panel or surface, and which maintains a relatively stable front-to-rear attitude as it moves through said fluid. Thus, the invention is applicable to bodies which do not tumble or spin back over front along their plane of travel, but rather maintain an attitude in which the rear panel or surface always remains at the tail end of the body. Stated in other words, the invention includes bodies (such as projectiles) which may spin or rotate about an axis parallel to the direction of travel but may not tumble o rotate about an axis vertical to the direction of travel.

The structure elements which are distributed over the rear surface of the said body in the present invention may be recesses or protrusions. In a preferred embodiment, the elements have a circular geometry, as in the form of a dimple. However, in their circular form, they may also be protrusions such as the brambles found on the surface of a raspberry. Other geometrical forms are also applicable, such as triangular or rectangular.

A feature of the invention is that structure elements are relatively shallow in depth or height, preferably having a dimension perpendicular to the rear panel of about 10–14% of the average cross-sectional dimension of said structure at the surface of the panel. A depth dimension of 12–13% is preferred. Regardless of the particular kind of body that is involved, the structure elements should cover from 70 to 90% of the rear panel or surface.

It is preferred that multiplicities of the structure elements be positioned proximate the sides of the rear panel or surface. Thus, in the case of a rectangular rear panel, such as on a truck, it is desirable that multiplicities of the structures be located proximate at least three sides of the panel.

These and other features of the invention will be understood upon reading of the following description along with the drawings.

DESCRIPTION OF THE PREFERRED EMBODIMENTS

1. Detailed Description of Embodiment Shown in FIGS. 1-5

Figure 1:
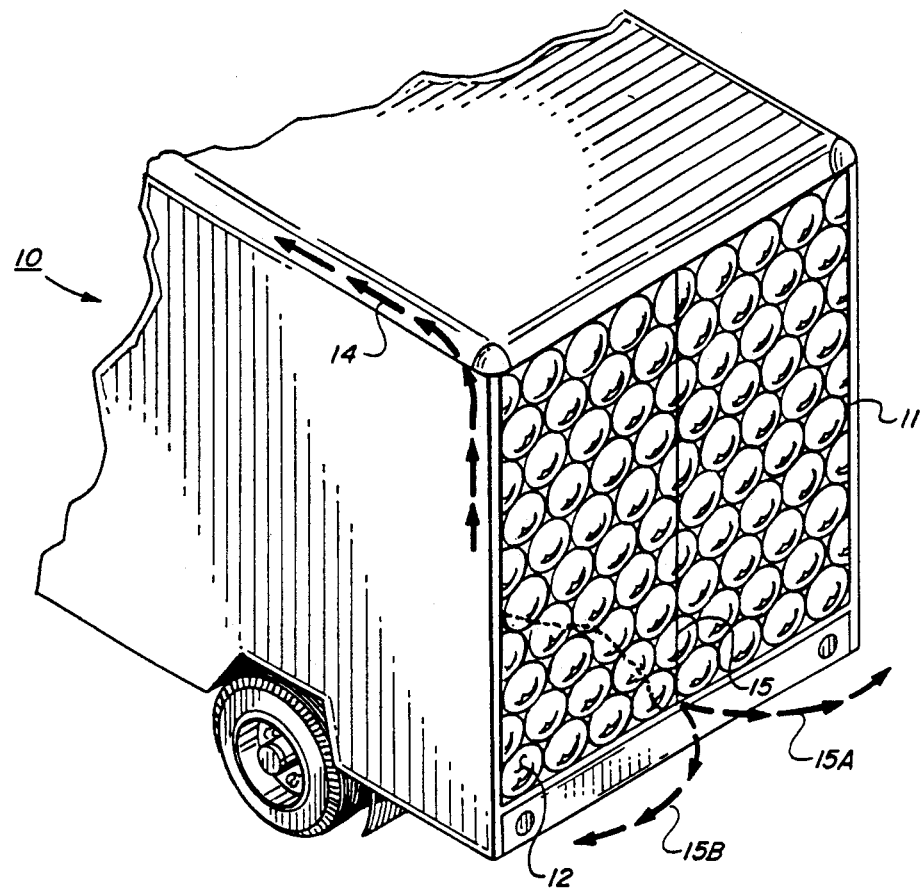
FIG. 1 is a perspective view of the rear surface of a tractor-trailer or van type motor vehicle indicating the structure fabricated therewith.
Figure 2:
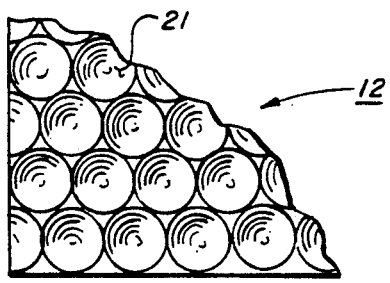
FIG. 2 shows a portion of the rear surface of a motor vehicle of the present invention wherein the structure fabricated therewith is implemented using circular cavities.

Referring now to FIG. 1, the rear panel or door surface of a motor vehicle having a rear surface capable of advantageously using the present invention is shown. The rear portion 10 of a tractor-trailer or a van has a rear surface 11 with which the structure of the present invention is associated. Section 12 of the rear surface 11 is shown enlarged in FIG. 2. The rear surface structure includes a multiplicity of cavities 21 (in FIG. 2) having a circular geometry. The circular cavities can have a wide range of dimensions. In the preferred embodiment, the radius of the opening of the cavity can be between 6 inches and 18 inches with the depth of the cavity being between about 0.5 to 2.5 inches. The foregoing dimensions are provided for illustration purposes and cavities having dimensions outside the range of the exemplary dimensions can be used to provide drag reduction.

Referring once again to FIG. 1, the line 15 indicates where, when the rear surface of the motor vehicle is enclosed by doors, the doors meet when closed. The arrows 15A and 15B indicate the motion of the doors as they are opened. For many van type and tractor-trailer type motor vehicles, the rear panel can be raised by sliding the rear panel under the roof of the motor vehicle as indicated by arrow 14.

Figure 3:
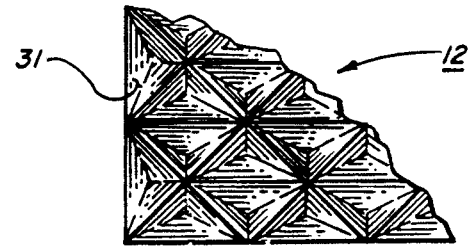
FIG. 3 shows a portion of the rear surface of a motor vehicle of the present invention wherein the structure fabricated therewith is implemented using triangular cavities.

Referring to FIG. 3, another configuration for the rear panel motor vehicle structure is shown. The structure is comprised of a multiplicity of triangular shaped cavities 31. In the preferred embodiment of this configuration, the base length of the triangle can be 18 inches in length while the sides of the triangle can be 12 inches in length. The depth of the triangles is typically only 10% to 14% of the narrowest dimension. However, the reduction in drag as a result of this configuration of cavities can be achieved for a large range of dimensions.

Figure 4:
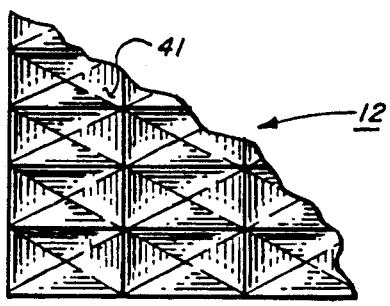
FIG. 4 shows a portion of the rear surface of a motor vehicle of the present invention wherein the structure fabricated therewith is implemented using rectangular cavities.

Referring to FIG. 4, the cavities 41 implementing the present invention are configured in the shape of rectangles. The linear dimensions of the rectangles are in the general range of 1 foot in length and a similar dimension in width. The depth of the cavity is generally a 10% to 14% of the narrowest dimension.

Figure 5:
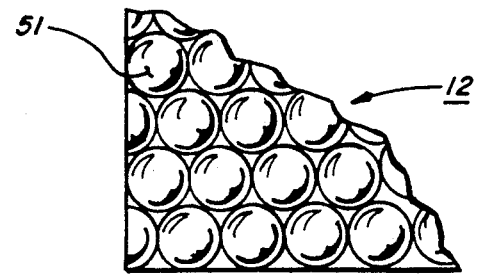
FIG. 5 shows a portion of the rear surface of a motor vehicle of the present invention wherein the structure fabricated therewith is implemented using circular projections.

Referring to FIG. 5, a different type of structure for the van or tractor-trailer type rear panel is shown. In particular, instead of cavity elements in the rear panel structure, the elements are comprised of protruding elements. In this embodiment, the protruding elements are circular and can have roughly the same dimensions as the circular cavities with the exception that the height dimension is approximately equal to the depth dimension of the cavities, but extends in the opposite direction from the rear surface. As will be clear, the circular configuration for the protruding structures can be replaced by geometries, inter alia, similar to the cavity structures of FIG. 3 and FIG. 4. In general, it has been found that the protruding structures are not as effective as the cavity structures.

2. Operation of the Embodiment of FIGS. 1-5

The use of the multiplicity of structures, whether cavity structures or protruding structures, has been found to reduce appreciably the drag experienced by the motor vehicle apparently due to turbulence at the rear of the motor vehicle. While the effect of the differences of the structure geometry is hard to quantify, general comments can be made. The structure elements typically have linear dimensions which can be approximately 1 foot in the plane of the rear panel. This general dimension permits a multiplicity of structure elements along each edge of the rear panel. The depth or height of the structure elements have a dimension in the range of up to a few inches. In addition, several structure elements should be as close as practical to the edge of the panel. In addition, the structure elements positioned on the interior of the rear panel are still effective to provide drag reduction. The surface of the rear panel, to the extent possible, should be coplanar with the rear edges of the sides of the motor vehicle.

The relatively shallow depth of the cavity structures or the relatively low height of the protruding structures permits the structure to be incorporated directly in the rear panel. As indicated by the references, prior art structures typically had to be moved in order to permit access to the interior of the motor vehicle. In the present invention, even the sliding panel type door whose motion is indicated in FIG. 1 by arrow 14 can be relatively conveniently accommodated because of the relatively narrow depth (or height) of the structure array.

Although the foregoing description has been presented in connection with motor vehicles such as tractor-trailers or vans, it will be understood that the invention is applicable to a substantially wider class of bodies which normally move through a fluid while maintaining a relatively stable front-to-rear attitude. Thus the invention is applicable to any type of motor vehicle having a rear surface, such as camper-trailers, camper shells, motor homes, buses; also the rear surfaces of all types of automobiles and motorcycles and the like.

In addition to land-based vehicles, the invention is also useful for all other craft having a rear surface, such as water craft and aircraft. One of the following sections describes the invention in connection with the water craft shown in FIG. 6. The invention is particularly useful for racing craft, and is applicable not only to the craft itself but also to paraphernalia associated with racing such as helmets and racing clothing.

Figure 7:
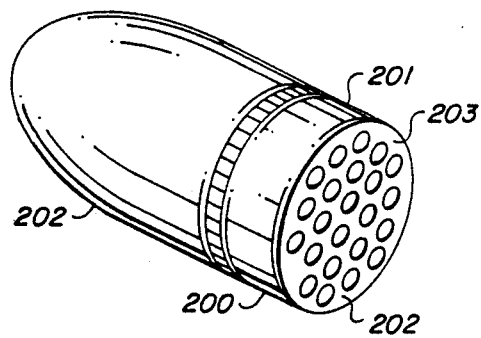
FIG. 7 is a perspective view of a projectile incorporating the structure elements of the present invention.

Further, the invention finds particular utility in connection with projectiles of the type having a front end and a rear panel or surface. One of the following sections describes the invention in connection with projectiles such as shown in FIGS. 7 and 8.

3. Description of Embodiment Shown in FIG. 6

Figure 6:
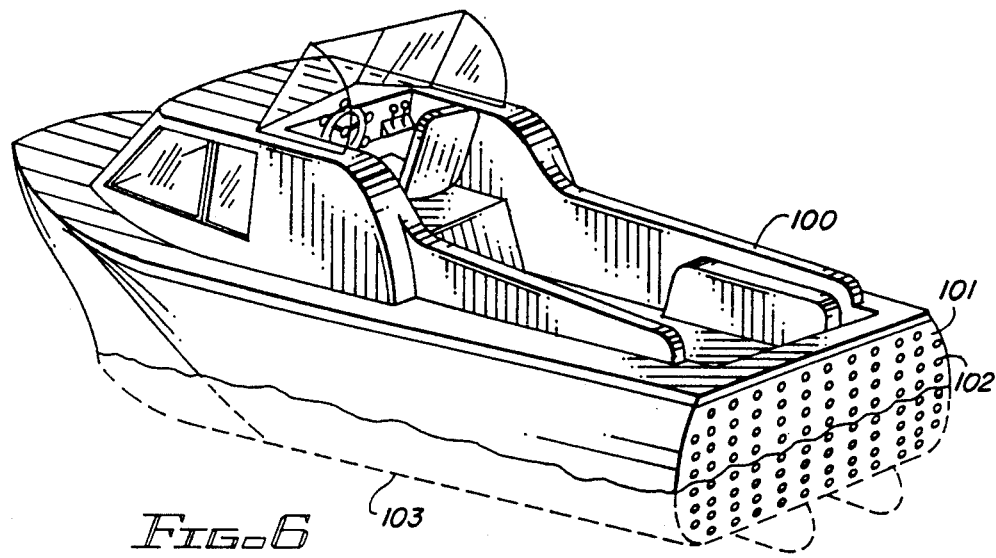
FIG. 6 shows use of the invention as applied to the rear surface of a water craft.

The boat of FIG. 6 is representative of a wide range of craft which will receive drag reduction benefits through use of the present invention. Craft such as motor boats, ships, racing craft, sail craft, aircraft, and the like are included. The structure elements may be applied to any rear panel surface, such as the rear of cabins, hulls, and masts, and are effective if applied either above or below the water line, or both.

FIG. 6 shows a cruiser type water craft 100 having a relatively flat rear or aft surface 101, which has been fabricated to provide dimples 102 covering substantially the entire rear surface. The portion of the hull below the water line is shown as a dotted line 103. Since the dimples 102 are located both above and below the water line, the representation is illustrative of the manner in which the present invention may be used to reduce drag in both an air and liquid medium.

4. Description of the Embodiment Shown in FIG. 7

The bullet of FIG. 7 is representative of a wide range of projectiles which may be benefited in terms of drag reduction by use of the present invention. Projectiles included in this embodiment of the invention are those which have a front end or nose and a relatively flat rear surface or tail, and which are relatively non-rotational in the plane of the direction of their travel through air or water. That is, they may spin or rotate about an axis parallel to the direction of travel but do not tumble or rotate about an axis vertical to the direction of travel. Projectiles of this kind include military ammunition, such as bullets, cartridges, artillery shells, torpedos, guided missiles, and the like; hunting ammunition, such as cartridges and shells; rockets; and the like.

FIG. 7 shows a bullet 200 having a main body casing 201, a nose 202, and a flat surface 203 at the tail. In the embodiment represented in this figure, the flat tail surface 203 has been fabricated with multiple dimples 204. The size of the dimples will vary according to the size of the bullet or other projectile, but generally the depth of the dimple will be approximately 10–14% of its diameter.

The invention may be applied to any size projectile of the type defined above and is not limited to any particular size. Bullets made from lead, copper, steel, tungsten-polymer mixes, bismuth, and the like are benefited, but the invention is not limited to these materials.

Tests conducted on bullets made according to this embodiment of the invention demonstrate that the bullets travel with substantially reduced drag, as exhibited by enhanced distance of carriage as well as depth of target penetration.

5. Description of the Embodiment Shown in FIG. 8

The buckshot shown in FIG. 8 is representative of a different embodiment including a group of small projectiles which do not have a rear flat surface, but which nevertheless exhibit an enhancement in drag reduction when fitted with the structures of the present invention.

FIG. 8 shows a typical shotgun pellet having a substantially spherical configuration and having its surface 303 covered with a multiplicity of pits 204 which contribute to the drag reduction effect. The size of the pellet may vary from the larger buckshot dimensions having a diameter of approximately 0.36" to the smaller shot having diameters as small as 0.10". The size of the pits in the surface must be varied according to the size of the shot, but it is generally preferred that the depth of the pit be in the range of 10–14% of the average cross-sectional dimension of the pit at the surface of the pellet. The pits may be incorporated in the configuration of the pellet by known means for pitting surfaces, including mechanical and chemical.

The materials from which the pellets are made may be any of the conventional metals or alloys used for this purpose, although it is preferred to use the harder materials which resist deformation resulting from the pressures of firing the gun. Thus, although the softer pellet materials such as drop shot or chilled shot exhibit some degree of improvement in performance, it is preferred to use the harder pellets such as magnum-grade, plated, or the softer steel materials, for shotgun use, or the harder steel pellets or ball bearings, for air rifle use.

Shotgun or air rifle pellets are extremely small in size, compared to other projectiles, and it is surprising to find that, in spite of this small configuration, they show substantially reduced drag merely by the technique of pitting their surfaces. In tests in which shotgun shells loaded with pitted 00 buckshot were fired from a shotgun resting on a support, at a target 50 yards away, the buckshot pattern consistently remained dead on target, while with comparable shotgun shells loaded with unpitted 00 buckshot, the buckshot pattern consistently exhibited a drop of 7" to 15".

Further evidence of the reduction in drag is shown in penetration tests which have been conducted with the dimpled pellets. In the tests, all shotgun shells used were Western Super X with "00" Buck pellets, some with dimples according to the present invention, and some without dimples. The gun used was a 12 gage Winchester Semi-automatic with a full choke, and the distance to the target was 60 yards. The targets were four 4'×4'×½" plywood panels separated by 1" blocks. Using regular undimpled pellets, 7 to 9 pellets did damage to the third plywood panel but did not go through it. One pellet went through in a weak area with no visible damage to the fourth panel. Most of the undimpled pellets fell off the front side of the third panel. Using dimpled pellets, 8 of 9 pellets went through the third panel and all did visual damage to the fourth panel. Most of the dimpled pellets fell off the front side of the fourth panel.

The foregoing description is included to illustrate the operation of the preferred embodiments and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. A method for reducing drag for a body moving through a fluid, said body having a front end, a relatively flat rear panel substantially orthogonal to the direction of movement of said body, and a relatively stable front to rear attitude as it moves through said fluid, said method comprising the steps of distributing structure elements on said rear panel, said structure elements having a dimension perpendicular to said rear panel of about 10–14% of the average cross-sectional dimension of said structure at the surface of said panel.

2. The method of claim 1 wherein multiplicities of said structures are positioned proximate each side of said rear panel.

3. The method of claim 1 wherein multiplicities of said structures are positioned proximate at least three sides of said rear panel.

4. The method of claim 1 wherein said providing step includes the step of fabricating said structure elements as cavities in the surface of said rear panel.

5. The method of claim 1 wherein said providing step includes the step of fabricating said structure elements as projections from the surface of said rear panel.

6. The method of claim 5 wherein said providing step includes a step of fabricating said structure elements with a circular geometry.

7. The method of claim 5 wherein said providing step includes a step of fabricating said structure elements with a triangular geometry.

8. The method of claim 5 wherein said providing step includes a step of fabricating said structure elements with a generally rectangular geometry.

9. The method of claim 1 wherein said body is a vehicle moving through air.

10. The method of claim 1 wherein said body is a watercraft.

11. The method of claim 1 wherein said body is an aircraft.

12. A body exhibiting reduced drag when moving through a fluid, said body comprising
   a. a front end and a relatively flat rear panel substantially orthogonal to the direction of movement of said moving body;
   b. means for maintaining a relatively stable front to rear attitude as said body moves through said fluid; and
   c. a multiplicity of structure elements positioned on said rear panel, said structure elements having a dimension perpendicular to said rear panel of about 10–14% of the average cross-sectional dimension of said structure at the surface of said panel.

13. The body of claim 12 wherein multiplicities of said structures are positioned proximate each side of said rear panel.

14. The body of claim 12 wherein multiplicities of said structures are positioned proximate at least three sides of said rear panel.

15. The body of claim 12 wherein said structure elements are cavities in the surface of said rear panel.

16. The body of claim 12 wherein said structure elements are projections from the surface of said rear panel.

17. The body of claim 12 wherein said structure elements have a circular geometry.

18. The body of claim 12 wherein said structure elements have a triangular geometry.

19. The body of claim 12 wherein said structure elements have a generally rectangular geometry.

20. The invention of claim 12 wherein said body is a vehicle moving through air.

21. The invention of claim 12 wherein said body is a watercraft.

22. The invention of claim 12 wherein said body is an aircraft.

* * * * *